United States Patent

Yamazaki

[11] Patent Number: 5,751,393
[45] Date of Patent: May 12, 1998

[54] SPECTACLES FRAME HAVING BIASED AUXILIARY TEMPLES

[75] Inventor: Kiyoshi Yamazaki, Fukui, Japan

[73] Assignee: Yugen Kaisha Yamasei Gankyo, Sabae, Japan

[21] Appl. No.: 780,321

[22] Filed: Jan. 8, 1997

Related U.S. Application Data

[63] Continuation-in-part of Ser. No. 638,185, Apr. 26, 1996, abandoned.

[51] Int. Cl.[6] ............................. G02C 5/08; G02C 5/14
[52] U.S. Cl. ............................................. 351/63; 351/119
[58] Field of Search ........................... 351/153, 63, 121, 351/140, 111, 118, 119, 113, 41; 2/454

[56] References Cited

U.S. PATENT DOCUMENTS 5,187,504 2/1993 Kanda ............................ 351/63
5,231,429 7/1993 Kanda ............................ 351/63

Primary Examiner—Hung X. Dang
Attorney, Agent, or Firm—Wenderoth, Lind & Ponack

[57] ABSTRACT

A spectacle frame which is low in height when folded, which is made up of a smaller number of parts and can be assembled efficiently at a low cost. Each auxiliary temple is connected to a mounting piece fixed to a lens frame so that it can be folded downward from the position in which it extends rearwardly from the mounting piece. When it is bent downward, it is resiliently urged upward. A main temple is connected to the rear end of each auxiliary temple so that it can be bend downward from the position in which it extends rearward from the auxiliary temple. Each auxiliary temple houses mechanisms for keeping the auxiliary temple in a predetermined position relative to the mounting piece and for keeping the main temple in a predetermined position relative to the auxiliary temple. It is thus possible to use the same parts for both these mechanisms and thus to reduce the number of parts of the entire spectacles.

11 Claims, 4 Drawing Sheets

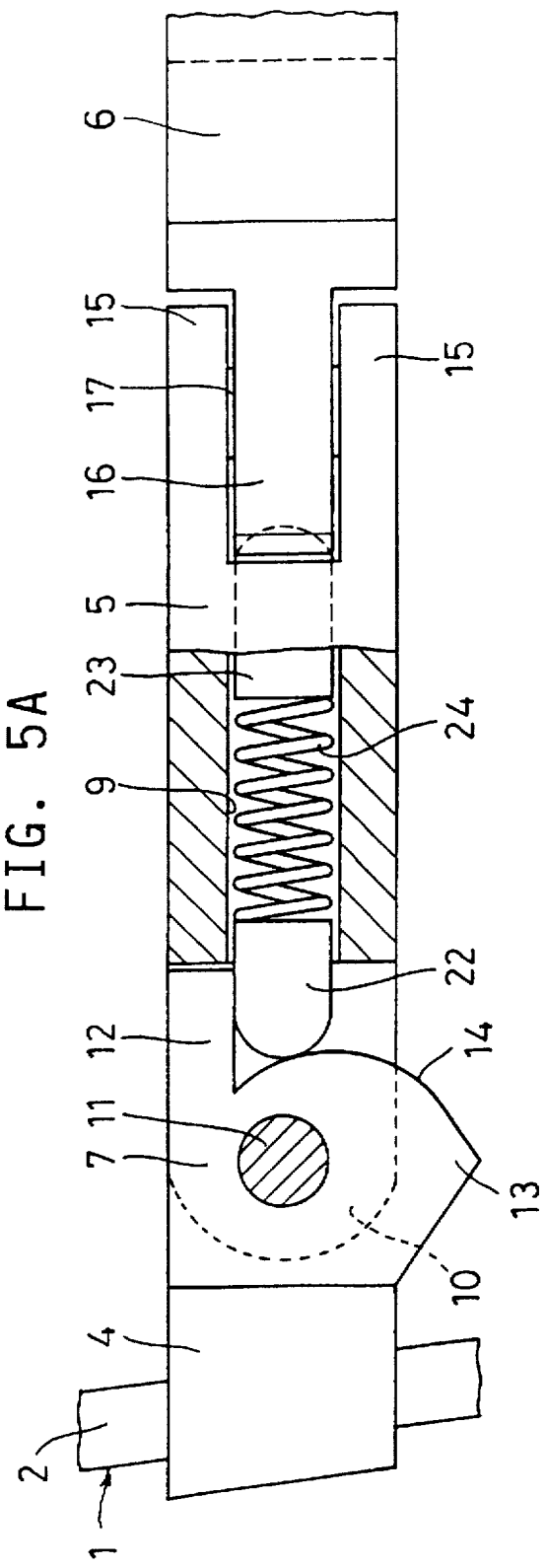
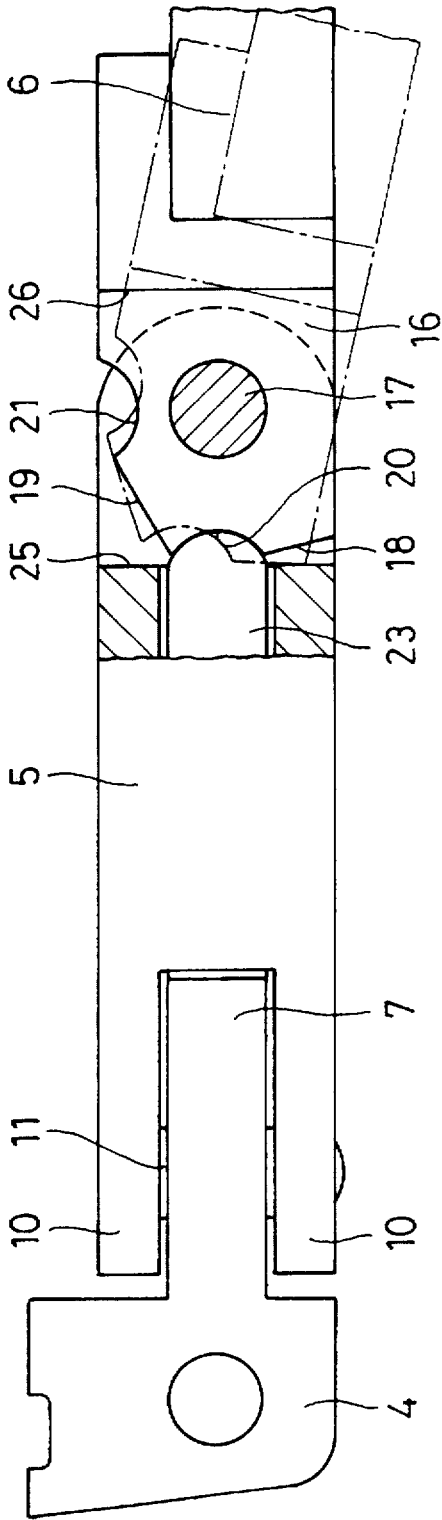
FIG. 5A
FIG. 5B 5,751,393

SPECTACLES FRAME HAVING BIASED AUXILIARY TEMPLES

This is a continuation-in-part of application Ser. No. 08/638,185, filed Apr. 26, 1996 now abandoned.

BACKGROUND OF THE INVENTION

This invention relates to a frame for spectacles, and more particularly to a spectacle frame which can be folded in two stages in a compact manner.

A spectacle frame which can be folded against a lens frame to a compact size with a minimum height is already known.

Such a conventional spectacle frame has short auxiliary temples connected to the respective lens frames so that they can be folded downwardly from their rearwardly extending positions. Resilient means are provided that resiliently keep the auxiliary temples in the position in which they extend rearwardly and the position in which they are bent downward. Long main temples are connected to the rear ends of the respective auxiliary temples through connecting means which permit the main temples to be folded inwardly from the position in which they extend rearwardly and which can resiliently keep the main temples both in the rearwardly extending position and the inwardly folded position.

In conventional arrangements, means for resiliently keeping the auxiliary temples in predetermined positions relative to the lens frame are mounted in the auxiliary temples, while means for resiliently keeping the main temples in predetermined positions relative to the auxiliary temples are mounted in the main temple.

Since these two means are separately mounted in the auxiliary and main temples, many parts are needed and assembling is troublesome and costly.

An object of this invention is to provide a spectacle frame which is made up of a smaller number of parts and can be assembled efficiently at a low cost.

SUMMARY OF THE INVENTION

According to this invention, there is provided a frame for spectacles comprising a pair of lens frames, mounting pieces fixed to the respective lens frames, auxiliary temples connected to the rear ends of the respective mounting pieces so as to permit the auxiliary temples to be folded downwardly from the position in which they extend rearwardly and to resiliently keep the auxiliary temples in the rearwardly extending position. Also, and main temples are connected to the rear ends of the respective auxiliary temples so as to permit the main temples to be folded inwardly from the position in which they extend rearwardly and to resiliently keep the main temples both in the rearwardly extending position and the inwardly folded position. Each of the auxiliary temples has mounted therein a means for permitting each auxiliary temple to be bent downward from a position in which it extends rearwardly from the mounting piece and for resiliently keeping each auxiliary temple in the position in which it extends rearwardly from the mounting piece, and a means for resiliently keeping the main temple in a position in which it extends rearwardly from the auxiliary temple and a position in which it is bent inwardly from the position in which it extends rearwardly from the auxiliary temple.

The auxiliary temple has a longitudinal through hole in which are mounted these means, which comprise an abutment abutting a cam surface of the mounting piece, an abutment abutting a cam surface of the main temple, and a spring biasing the abutments away from each other.

Each auxiliary temple has its front end pivotally supported on the cam formed on the mounting piece with the abutment in the auxiliary temple kept abutting the cam surface of the cam. The cam provided at the front end of each main temple is pivotably supported on the rear end of the auxiliary temple with the abutment in the auxiliary temple kept abutting the cam surface of this cam.

Other features and objects of the present invention will become apparent from the following description made with reference to the accompanying drawings, in which:

BRIEF DESCRIPTION OF THE DRAWINGS

FIG. 5A is a partially cutaway front view of a mounting piece, auxiliary temple and main temple, showing how they are connected together;

FIG. 5B is a partially cutaway plan view of the structure shown in FIG. 5A;

DETAILED DESCRIPTION OF THE PREFERRED EMBODIMENT

Figure 1:
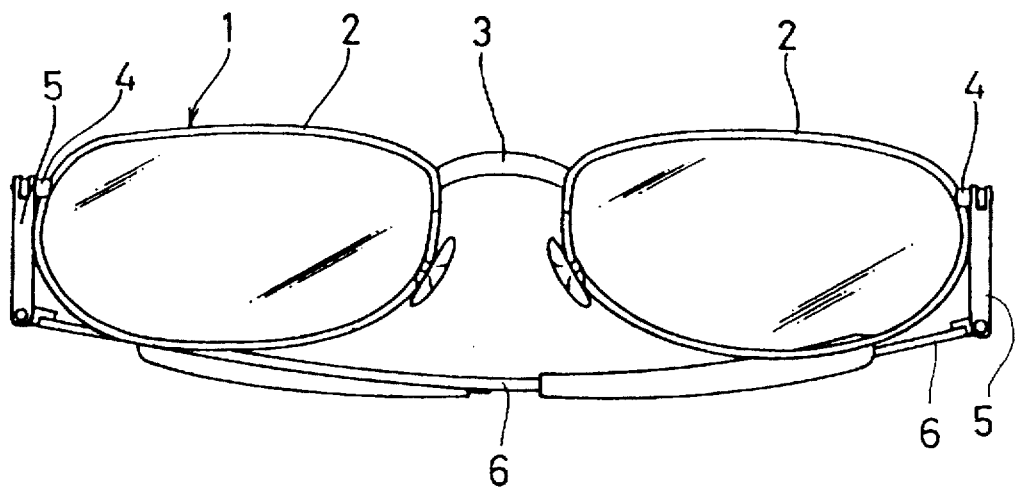
FIG. 1 is a front view of the spectacle frame according to the present invention showing its folded state.

Now referring to the drawings, an embodiment of this invention is described.

As shown the spectacle frame 1 of this embodiment includes a pair of lens frames 2 connected together by a bridge 3 and provided at their outer ends with mounting pieces 4 to which short auxiliary temples 5 are mounted. Long main temples 6 are connected to the rear ends of the auxiliary temples 5.

Figure 4:
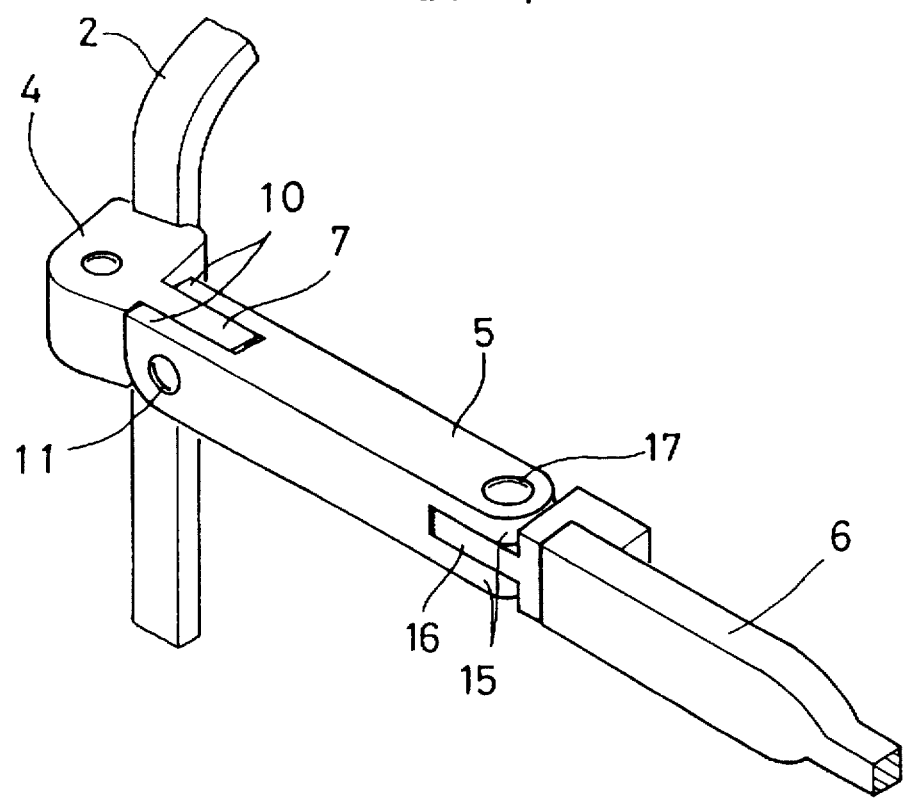
FIG. 4 is a partial perspective view of the spectacle frame.
Figure 6A:
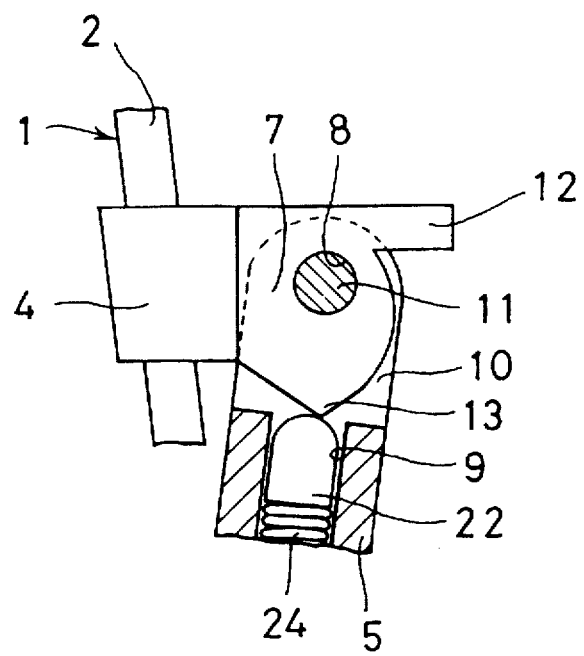
FIG. 6A is a vertical sectional side view of an auxiliary temple in a folded state.
Figure 6B:
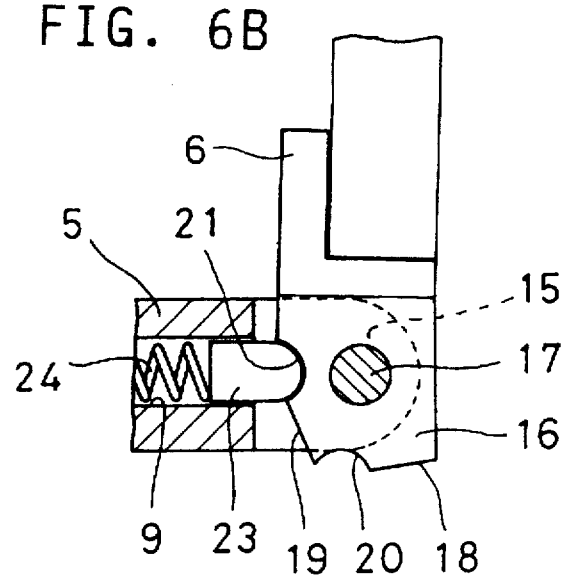
FIG. 6B is a plan view in cross-section of a main temple in a folded state.

As shown in FIGS. 4 and 5, the mounting pieces 4 are brazed to the outer surface of the lens frames 2. They also serve as an endpiece for connecting a split portion of each lens frame by a screw. Each mounting piece 4 has a vertical front cam 7 protruding rearwardly from its back and formed with a screw hole 8 extending laterally therethrough.

Each auxiliary temple 5 is formed with a longitudinal through hole 9 and has bifurcated ends 10. With the bifurcated ends 10 fitted on the cam 7, a screw 11 is inserted through holes in the bifurcated ends 10 and the hole 8 to couple the auxiliary temples 5 to the mounting pieces 4 (FIG. 4).

As seen in FIGS. 5A and 5B, the front cam 7 of each mounting piece 4 has a cam surface 14 comprising a rear rounded corner and protrusions 12 and 13 at top and bottom of the rear rounded corner.

Further, each auxiliary temple 5 has bifurcated rear ends 15 (FIG. 4). Each main temple 6 has a horizontal cam 16 protruding from its front end. The cam 16 is inserted into between the bifurcated ends 15 of the auxiliary temple 5 and coupled thereto by a screw 17.

As shown in FIGS. 5A and 5B, the cam 16 of each main temple 6 has front and inner cam surfaces 18 and 19 that extend substantially at a right angle from each other. The cam surfaces 18 and 19 have recesses 20 and 21, respectively.

The cam surface 19 extends from the recess 20 to the recess 21 obliquely with the distance to the axis of the screw 17 decreasing. Thus when the abutment 23 gets out of the recess 20, the main temple 6 will bend automatically with respect to the auxiliary temple.

Mounted in the hole 9 of each auxiliary temple 5 are a means for resiliently holding the temple 5 in the position in which it extends rearwardly from the mounting piece 4 and in the position in which it is bent downwardly, and a means for resiliently keeping the main temple 6 in the position in which it extends rearwardly from the auxiliary temple 5 and the position in which it is bent inwardly.

As shown in FIG. 5, both these means are axially movable in the hole 9. These means comprises an abutment 22 abutting the cam surface 14 of the mounting piece 4, an abutment 23 in abutment with the cam surface 18 or 19 of the main temple 16, and a spring 24 mounted between the abutments 22 and 23 in a compressed state and pressing the abutments 22 and 23 against the respective cam surfaces. That is, both means are mounted in the auxiliary temple 5. The spring 24 is a part of either means.

The spring 24 resiliently keeps the auxiliary temple 5 extending rearward from the mounting piece 4 by pressing the abutment 22 against the protrusion 12. By pushing down the auxiliary temple 5 from this position, the abutment 22 moves downward along the cam surface. When the abutment 22 passes the protrusion 13, the auxiliary temple is held in the position in which it is bent downward by about 90° with respect to the mounting piece 4. When the abutment 22 is pushed up from this position and passes the protrusion 13, the auxiliary temple 5 is allowed to automatically pivot back to its rest position, i.e. the position in which it extends rearward.

Since the auxiliary temple 5 can be pivoted or folded only downward with respect to the mounting piece 4, the connecting structure therebetween is simple, so that it is possible to use a small mounting piece 4.

While the main temple 6 is in the position shown in FIGS. 5A and 5B, in which it extends rearwardly from the auxiliary temple 5, the abutment 23 fits in the recess 20 of the front cam surface 18, resiliently keeping the temple 6 in this position. When the temple 6 is folded inwardly by 90° from the rest position, the abutment 23 fits in the recess 21 of the inner cam surface 19, resiliently keeping the temple 6 in this position. Thus, the main temple 6 can be kept either in the position in which it extends rearwardly from the auxiliary temple 5 or in the inwardly folded position.

As shown in FIGS. 5A and 5B, with each main temple 6 kept in the rearwardly extending position, a wedge-like space is defined between the rear end faces 25 of the bifurcated ends 15 of the auxiliary temple 5 and the front-end surfaces 26 of the main temple 6 over and under the root of the cam 16. This space permits the main temple 6 to pivot further outwardly about the screw 17 from the position shown e.g. in FIG. 5A.

Figure 2:
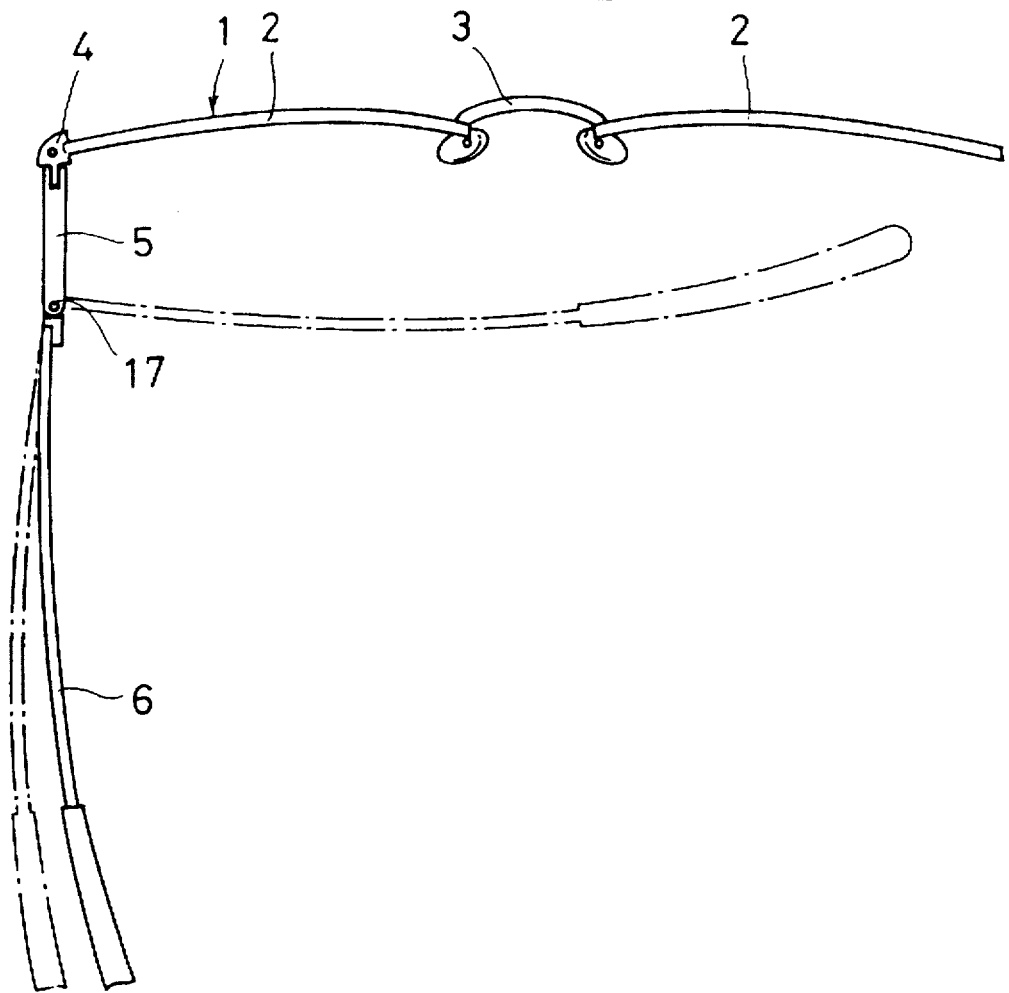
FIG. 2 is a plan view of the spectacle frame.
Figure 3:
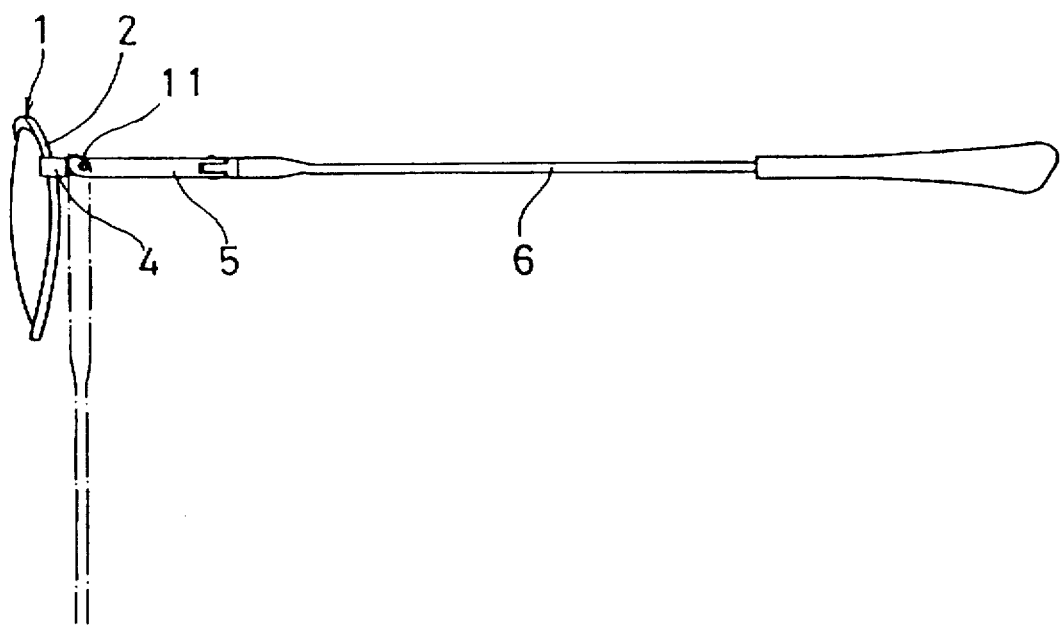
FIG. 3 is a side view of the spectacle frame.

That is, this space permits the main temple 6 to pivot outwardly from the position shown by solid line in FIGS. 2 and 5B to the position shown by chain line, where the cam surface 18 abuts the rear end faces 25. In this state, the main temple 6 is biased toward the position shown by the solid line in FIG. 2 due to the action of the abutment 23 biased by the spring 24 and the cam surface.

This arrangement is simple in structure because the main temple 6 can be bent further outwardly from the position shown by solid line simply by providing the wedge-like space between the end faces 25 and 26.

When not in use, as shown in FIG. 1, the auxiliary temples 5 on both sides are folded downward and then the main temples 6 are folded inward. In this state, the main temples 6 are right under the lens frames 2, so that the entire spectacle frame is the least bulky with substantially no height. Thus, it can be put in a narrow space.

When the abutment 22 of the auxiliary temple 5 passes the protrusion 13, the auxiliary temple 5 is held in its folded position in which it extends downwardly. Also, when the abutment 23 engages in the recess 21 in the cam 16, the main temple 6 is held in its inwardly folded position.

If the auxiliary temple 5 is folded to such a degree that the abutment 22 does not pass the protrusion 13, the auxiliary temple 5 will extend automatically from its folded position when the spectacle case is opened.

To put on the frame 1, the auxiliary temples 5 and the main temples 6 are unfolded so that they extend rearwardly in a straight line. The main temples can be resiliently bent further outwardly from the rearwardly extending position, so that they will softly fit the temples of a human head with the least possibility of giving pain to the wearer.

Each of the auxiliary temples has mounted therein a means for permitting each auxiliary temple to be bent downward from a position in which it extends rearwardly from the mounting piece and for resiliently keeping each auxiliary temple in the position in which it extends rearwardly from the mounting piece, and a means for resiliently keeping the main temple in a position in which it extends rearwardly from the auxiliary temple and a position in which it is bent inwardly from the position in which it extends rearwardly from the auxiliary temple. With this arrangement, it is possible to use the same parts for both of these two means. This leads to reduction in the number of parts and cost and makes assembling easy.

What is claimed is:

1. A frame for spectacles comprising:

a pair of lens frames;

mounting pieces fixed to said lens frames, respectively;

auxiliary temples connected to rear ends of said mounting pieces, respectively, so as to permit said auxiliary temples to be folded downwardly from a position in which they extend rearwardly and to resiliently maintain said auxiliary temples in the rearwardly extending position; and main temples connected to rear ends of said auxiliary temples, respectively, so as to permit said main temples to be folded inwardly from a position in which they extend rearwardly and to resiliently maintain said main temples both in the rearwardly extending position and an inwardly folded position, wherein each of said auxiliary temples is provided with a means for permitting said auxiliary temple to be bent downward from a position in which it extends rearwardly from said respective mounting piece and for resiliently maintaining said auxiliary temple in the rearwardly extending position, and for resiliently holding said corresponding main temple in the position in which it is bent inwardly from the position in which it extends rearwardly from the corresponding auxiliary temple.

2. The frame for spectacles as claimed in claim 1, wherein each of said auxiliary temples has a longitudinal through hole, and said means, provided with each of said auxiliary temples, comprises:

a first cam member provided on said corresponding mounting piece and having a cam surface;

a second cam member provided on said corresponding main temple and having a cam surface;

a spring provided in said corresponding longitudinal through hole;

a first abutment engaging said spring and abutting said cam surface of said first cam member;

a second abutment engaging said spring and abutting said cam surface of said second cam member, wherein said spring biases said first and second abutments away from each other and against said cam surfaces of said first and second cam members.

3. The frame for spectacles as claimed in claim 2, wherein each of said first cam members includes a protrusion formed on said cam surface such that said corresponding auxiliary temple can be locked in the folded position.

4. The frame for spectacles as claimed in claim 2, wherein each of said second cam members includes:

a first recess formed in said cam surface in which said second abutment engages when said corresponding main temple substantially aligns with said corresponding auxiliary temple, and a second recess formed in said cam surface in which said second abutment engages when said corresponding main temple is bent inwardly by a predetermined angle with respect to said corresponding auxiliary temple.

5. The frame for spectacles as claimed in claim 4, wherein, when said second abutment is engaged in said first recess, a gap is formed between a surface of said corresponding auxiliary temple and an end surface of said corresponding main temple.

6. The frame for spectacles as claimed in claim 5, wherein, when said second abutment is engaged in said first recess and said corresponding main temple is pushed outwardly until said gap disappears, said second abutment is pushed inwardly by said cam surface of said second cam member and said spring is compressed.

7. A spectacle frame comprising:

a first lens frame and a second lens frame, said first lens frame being connected to said second lens frame;

a first mounting piece and a second mounting piece fixed to said first and second lens frames, respectively, said first mounting piece including a forward cam member having a cam surface, and said second mounting piece including a forward cam member having a cam surface;

a first auxiliary temple member pivotally connected to said first mounting piece and having a longitudinally extending through hole, a spring disposed in said through hole, a first abutment member engaging a first end of said spring, and a second abutment member engaging a second end of said spring;

a second auxiliary temple member pivotally connected to said second mounting piece and having a longitudinally extending through hole, a spring disposed in said through hole, a first abutment member engaging a first end of said spring, and a second abutment member engaging a second end of said spring;

a first main temple member pivotally connected to said first auxiliary member and including a rearward cam member having a cam surface;

a second main temple member pivotally connected to said second auxiliary member and including a rearward cam member having a cam surface, wherein said first abutment members of said first and second auxiliary members are biased into engagement with said forward cam members first and second mounting pieces, respectively, and said second abutment members are biased into engagement with said rearward cam member of said first and second main temple members, respectively.

8. The spectacle frame as claimed in claim 7, wherein said wherein each of said cam surfaces of said forward cam members is formed with a protrusion such that said corresponding auxiliary temple can be locked in a downward folded position.

9. The spectacle frame as claimed in claim 7, wherein said each of said rearward cam members of said first and second main temple members includes a first recess formed in said cam surface in which said second abutment of said corresponding auxiliary member engages when said main temple member substantially aligns with said corresponding auxiliary temple, and a second recess formed in said cam surface in which said second abutment of said corresponding auxiliary member engages when said corresponding main temple is bent inwardly by a predetermined angle with respect to said corresponding auxiliary temple.

10. The spectacle frame as claimed in claim 9, wherein when said second abutments of said first and second auxiliary members are engaged in said first recesses of said rearward cam members, respectively, a gap is formed between a surface of each of said first and second auxiliary temple members and an end surface of each of said first and second main temple members, respectively.

11. The spectacle frame as claimed in claim 10, wherein, when said second abutments of said first and second auxiliary members are engaged in said first recesses of said rearward cam members, respectively, and said first and second main temple members are pushed outwardly until said gap disappears, said second abutments are pushed inwardly by said cam surfaces of said rearward cam members, respectively, and said springs of said first and second auxiliary members are compressed.

* * * * *